A. PEARCE.
FRUIT HULLER.
APPLICATION FILED AUG. 6, 1920.

1,399,870. Patented Dec. 13, 1921.

INVENTOR
Amy Pearce
BY
ATTYS

UNITED STATES PATENT OFFICE.

AMY PEARCE, OF MISSION CITY, BRITISH COLUMBIA, CANADA.

FRUIT-HULLER.

1,399,870.  Specification of Letters Patent.  Patented Dec. 13, 1921.

Application filed August 6, 1920. Serial No. 401,736.

*To all whom it may concern:*

Be it known that I, AMY PEARCE, a subject of the King of Great Britain, and a resident of Mission City, in the Province of British Columbia, Canada, have invented certain new and useful Improvements in Fruit-Hullers, of which the following is a specification.

My invention relates to improvements in fruit hullers, with more particular reference to a device of this character used for hulling strawberries, and the object of my invention is to provide a simple, inexpensive, and efficient means which will enable the fruit to be picked in an easy and comfortable manner and prevent the fingers from becoming sodden with juice, the nails from tearing and wearing down, and the tips of the fingers from becoming sore, all of which disadvantages exist at the present time where the berries are picked and hulled without the use of such finger-protecting means.

I attain this object by the construction illustrated in the accompanying drawings in which—

Similar figures of reference indicate similar parts in the views.

Figure 1:
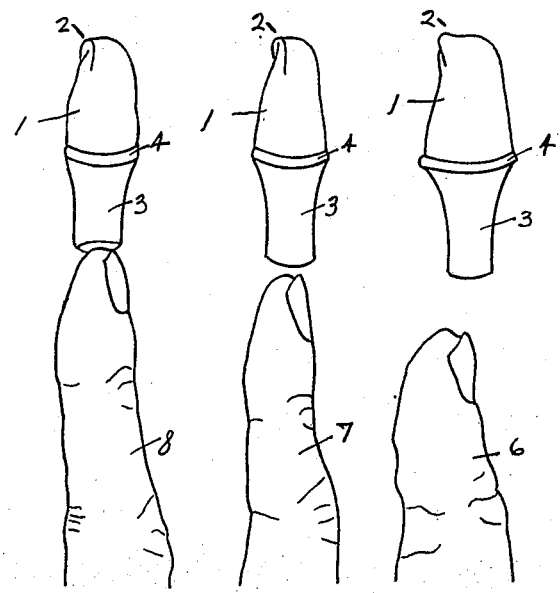
Figure 1 shows the right hand thumb, first and second fingers with their respective hullers, detached therefrom.
Figure 2:
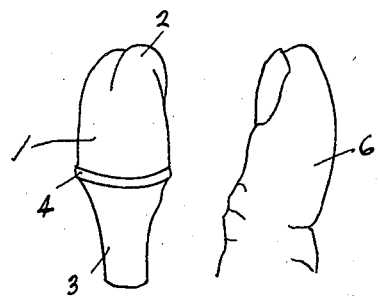
Fig. 2 shows the opposite side of the thumb and its huller.

The device consists of a metallic thimble-like finger-tip-protector 1, which may be made in all sizes to fit all hands, being constructed of suitable light thin metal so that the movements of the fingers will not be obstructed, the shape of the member being slightly flat. At its upper end on one side the thimble 1 is raised slightly as at 2 so as to form, as it were, a false "nail" and the false nail 2 of the thumb thimble is arranged at an oblique angle, as shown in Fig. 2, so as to meet squarely the "nails" of the first and second finger thimbles. 3 indicates a rubber tube adapted to be slipped over the finger or thumb, and which is made tight enough to hold the thimble firmly in position and also to keep out the fruit juice, while 4 indicates a band of metal or other suitable material, which connects the thimble and the rubber tube together. The tube 3 is of an elastic nature so that it may be turned back over the thimble to enable the latter to be put in place easily.

The thumb, first and second fingers, indicated by the numerals 6, 7 and 8 respectively, are each fitted with one of the thimbles described above, from which it will be seen that the fruit picking and hulling operation may be performed efficiently and without discomfort since the finger tips and nails are effectively protected against soreness and damage resulting from continued direct contact with the fruit and fruit juice.

What I claim as my invention is:

A fruit huller comprising, a metallic thimble-like protector for the finger tip adapted to entirely inclose the same and conforming to the shape thereof, said protector being slightly raised on one side at its closed end to form an integral false nail, and an elastic tube secured to the open end of said protector adapted to grip tightly the finger when slipped thereover.

Signed at Mission City, B. C., Canada, this 14 day of July, 1920.

AMY PEARCE.